(12) United States Patent
Whitaker

(10) Patent No.: US 7,750,916 B2
(45) Date of Patent: Jul. 6, 2010

(54) MEMORY ADDRESSING TECHNIQUES

(75) Inventor: Martin Whitaker, Buckinghamshire (GB)

(73) Assignee: Aspex Technology Limited, Buckinghamshire (GB)

( * ) Notice: Subject to any disclaimer, the term of this patent is extended or adjusted under 35 U.S.C. 154(b) by 1234 days.

(21) Appl. No.: 10/499,875

(22) PCT Filed: Dec. 20, 2002

(86) PCT No.: PCT/GB02/05852

§ 371 (c)(1),
(2), (4) Date: Mar. 14, 2005

(87) PCT Pub. No.: WO03/054707

PCT Pub. Date: Jul. 3, 2003

(65) Prior Publication Data

US 2005/0206649 A1    Sep. 22, 2005

(30) Foreign Application Priority Data

Dec. 20, 2001  (GB) ................................. 0130534.1

(51) Int. Cl.
  G06F 12/06 (2006.01)
  G06F 12/00 (2006.01)
  G06F 12/10 (2006.01)
(52) U.S. Cl. ....................... 345/571; 345/564; 345/568; 345/572; 345/574
(58) Field of Classification Search ......... 345/564–568, 345/571–574
  See application file for complete search history.

(56) References Cited

U.S. PATENT DOCUMENTS

| | | | |
|---|---|---|---|
| 4,819,152 A | 4/1989 | Deerfield | |
| 4,855,903 A | 8/1989 | Carleton et al. | |
| 5,241,626 A | 8/1993 | Taoda | |
| 5,467,459 A | 11/1995 | Alexander et al. | |
| 5,586,256 A * | 12/1996 | Thiel et al. | 710/100 |
| 5,634,043 A | 5/1997 | Self et al. | |
| 5,900,878 A | 5/1999 | Goto et al. | |
| 6,282,625 B1 * | 8/2001 | Porterfield | 711/206 |
| 6,438,675 B1 * | 8/2002 | Root et al. | 711/217 |

FOREIGN PATENT DOCUMENTS

| | | |
|---|---|---|
| EP | 0201174 | 10/1986 |
| EP | 0 716 378 A1 | 6/1996 |
| EP | 0 908 849 | 4/1999 |
| JP | 61-231639 | 10/1986 |
| JP | 09-081770 | 3/1997 |
| JP | 10-011614 | 1/1998 |
| WO | WO 02/42906 | 5/2002 |

* cited by examiner

*Primary Examiner*—Hau H Nguyen
(74) *Attorney, Agent, or Firm*—Oppenheimer Wolff & Donnelly LLP

(57) ABSTRACT

A method of generating a stream of non-contiguous memory addresses representing contiguous points in logical space is described. The method comprises: generating initializing parameters describing the contiguous points in the logical space; configuring a memory address engine with the initializing parameters; performing an algorithm in the memory address engine according to the initialising parameters to produce a plurality of non-contiguous memory addresses; and collating the non-contiguous memory addresses into the stream of memory addresses for output to a data memory. The present invention has particular application to SIMD processing techniques where there are a plurality of memory address engines.

32 Claims, 8 Drawing Sheets

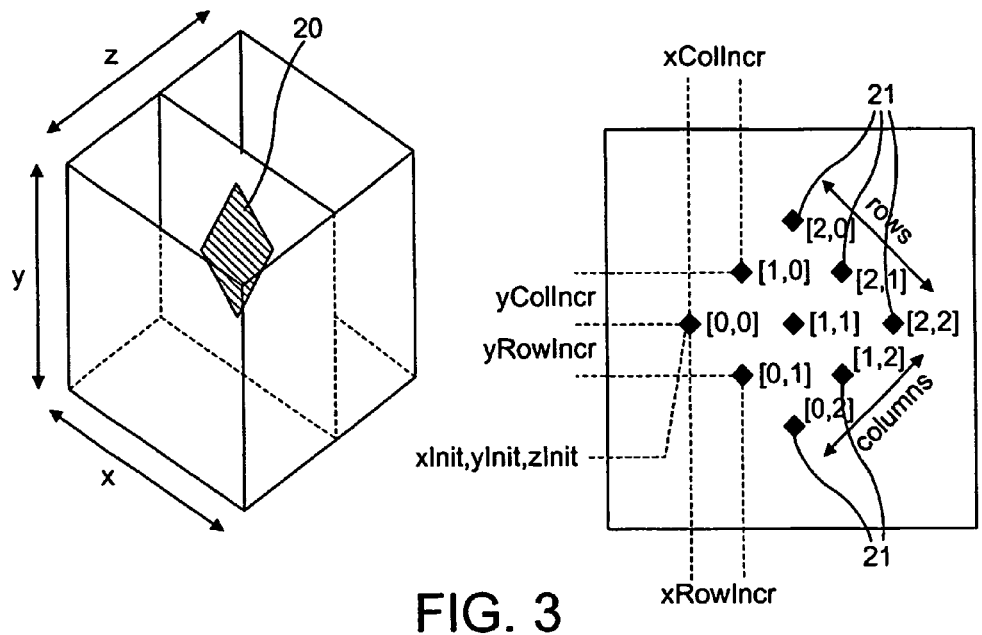
FIG. 3
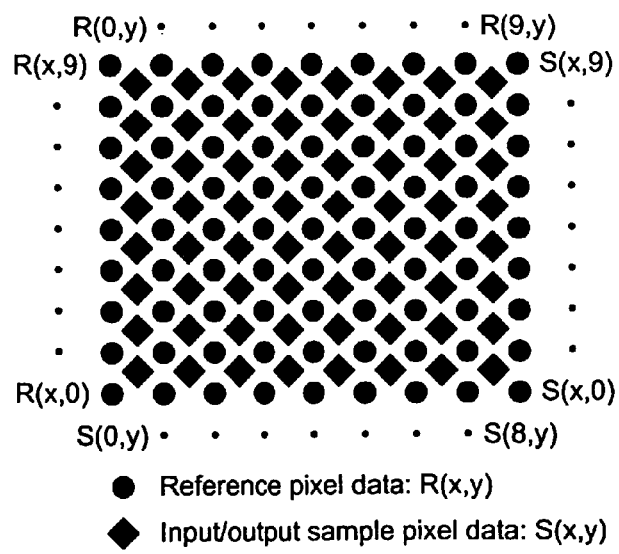
- ● Reference pixel data: R(x,y)
- ◆ Input/output sample pixel data: S(x,y)
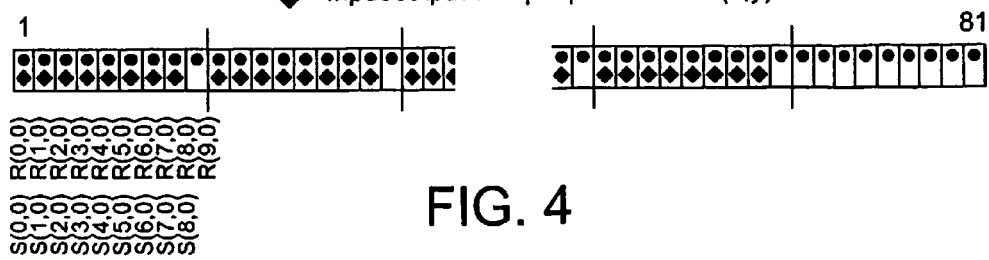
FIG. 4

| csr | Address | Description |
|---|---|---|
| Function | | Main function control register |
| AddressBase | | Offset of start of data in the local SDS. |
| TfrLength | | Number of elements to be transferred. |
| RowLimits | | {Start,End} index of the patch row counter. |
| RowBounds | | {Upper,Lower} bound of the patch row counter for non NULL tranfers. |
| ColLimits | | {Start,End} index of the patch column counter. |
| ColBounds | | {Upper,Lower} bound of the patch column counter for non NULL tranfers. |
| aInit | | The initial location in address memory for address memory tranfers. |
| xInit | | The initial x axis coordinate of the patch data. |
| yInit | | The initial y axis coordinate of the patch data. |
| xInit | | The initial z axis coordinate of the patch data. |
| xColIncr | | The change in x coordinate corresponding to an increment in the column counter. |
| yColIncr | | The change in y coordinate corresponding to an increment in the column counter. |
| zColIncr | | The change in z coordinate corresponding to an increment in the column counter. |
| xRowIncr | | The x coordinate change required to move from the end of a row to the beginning of the next. |
| yRowIncr | | The y coordinate change required to move from the end of a row to the beginning of the next. |
| zRowIncr | | The z coordinate change required to move from the end of a row to the beginning of the next. |
| xWrapBase | | The lower global x coordinate value marking the boundary of the local SDS. |
| xWrapSize | | The number of x coordinate steps from xWrapBase to the upper boundary of the local SDS. |
| yWrapBase | | The lower global y coordinate value marking the boundary of the local SDS. |
| yWrapSize | | The number of x coordinate steps from yWrapBase to the upper boundary of the local SDS. |
| zWrapBase | | The lower global z coordinate value marking the boundary of the local SDS. |
| zWrapSize | | The number of x coordinate steps from zWrapBase to the upper boundary of the local SDS. |
| xHardBound | | The global x coordinate value marking the {upper,lower}boundary of the global data set. |
| yHardBound | | The global y coordinate value marking the {upper,lower}boundary of the global data set. |
| zHardBound | | The global z coordinate value marking the {upper,lower}boundary of the global data set. |
| xScale | | The number of bytes in memory required to move 1 step along the x-axis. |
| yScale | | The number of bytes in memory required to move 1 step along the y-axis. |
| zScale | | The number of bytes in memory required to move 1 step along the z-axis. |

FIG. 7

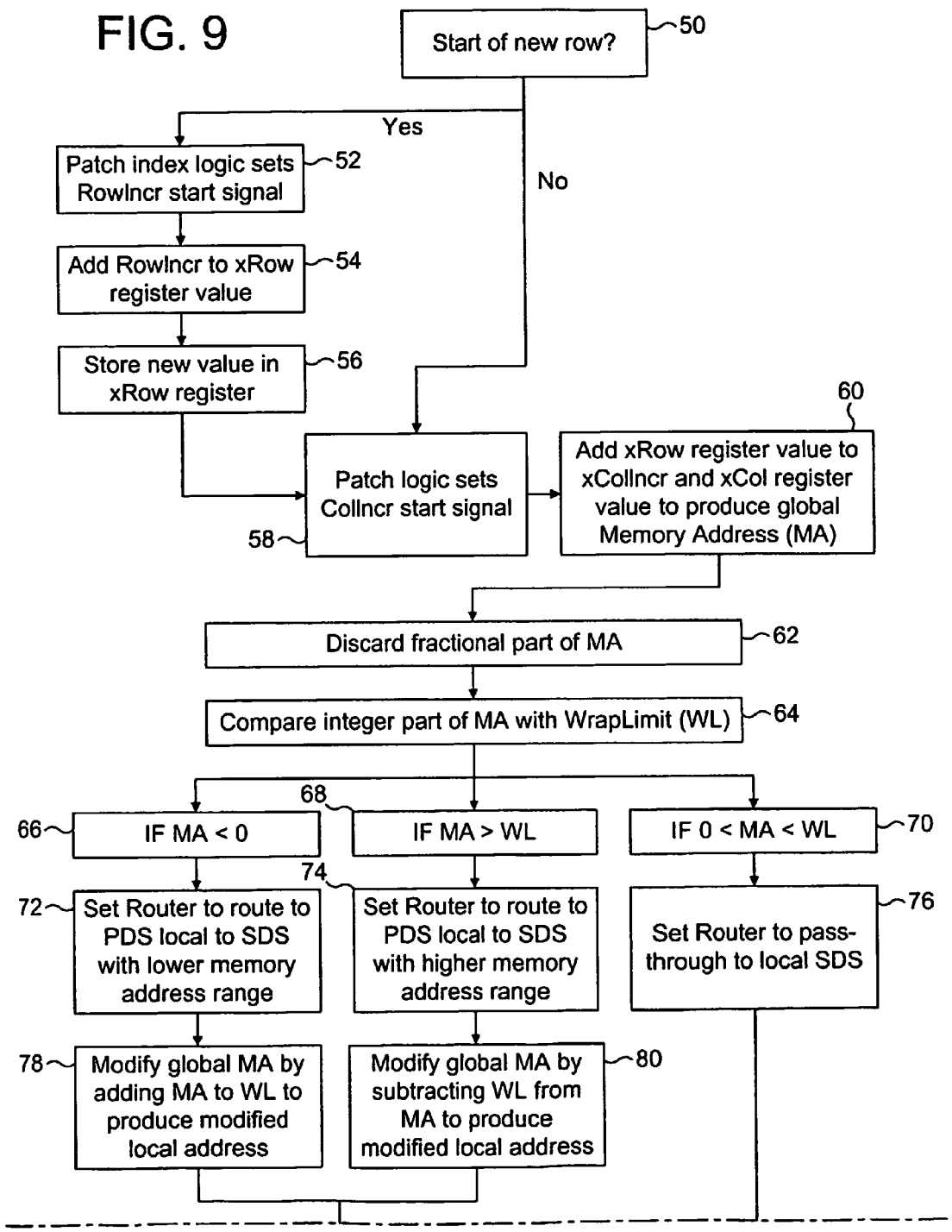

MEMORY ADDRESSING TECHNIQUES

The present invention concerns improvements relating to memory addressing techniques and in particular, but not exclusively, this invention relates to generating memory addresses for data held in a memory store for use with microprocessors.

In FIG. 1 there is shown a simple prior art processing system comprising a CPU 2, a DMA engine 8 and a memory store 4. The CPU 2 is connected to the memory store 4 by a databus 6. The CPU transmits a memory address request to the DMA engine 8 which pages the memory store 4 to send data residing at that memory address to the CPU 2 for processing. The data sent from the memory store 4 may be collected in a memory cache (not shown) before the CPU is ready to process the data sent from the memory store.

Modern microprocessor architecture is based upon the concept of a central processing unit (CPU) processing data sent to it from a memory store. The processed data can then be sent elsewhere for further processing, returned to storage or to a peripheral for display. The unprocessed data is kept in the memory store and is made ready for sending to the CPU when the memory store is paged by a memory manager. The memory manager is commonly referred to as a direct memory access (DMA) engine. The DMA engine is the microprocessor component responsible for handling memory access requested by the CPU and it receives from the CPU instructions as to what data the CPU requires next, as well as the addresses in the memory store at which that data is located. Paged data requested from the memory store is sent along a databus to the CPU for processing.

It is an important consideration in microprocessor design that the CPU spends as many clock cycles as possible processing data and not waiting for data to arrive from the memory store, nor spending clock cycles working out what data it needs next. With the advent of multi-threading processors and vector processors, which are able to process data in parallel and carry out multiple instructions at once, the data demand rate of modern CPUs has meant that new techniques for keeping the CPU supplied with data have had to be invented. One technique is that of a memory hierarchy, which takes advantage of temporal and spatial locality.

The principle of memory hierarchy relies upon the facts that accessed memory data will be accessed again quickly (temporal locality), and that memory data adjacent to recently-accessed memory data will be accessed soon (spatial locality). Memory hierarchy is implemented by having a series of memory caches, starting with the largest main memory store (usually a hard disk drive of many gigabytes), decreasing in size and increasing in response speed until on-die memory caches of a few kilobytes running at the same speed as the CPU core.

Even so, having eased the problem of serving data to the CPU there is still the question of how to speed up the process of generating the memory address calls in the first place. This task has usually been handled by the DMA controller referred to above. However in the case of where a complex series of address is required a DMA is generally unsuited to the role and the CPU itself becomes responsible. With a CPU design that only has one execution pipeline, the whole CPU is taken up with processing memory addresses until as many clock cycles have passed as is necessary to generate this next batch of memory addresses. Modern superscalar CPU designs have more than one execution unit and these execution units can be programmed to carry out the task of the memory manager in processing and generating memory addresses.

However, as execution units must be able to take on any type of processing required by the CPU, execution units are normally full floating point units able to carry out complex calculations and may comprise an arithmetic and logic unit (ALU), registers and other electronic components of their own. Dedicating such a powerful part of the CPU simply to memory address generation is generally considered a waste of CPU processing ability, and requires additional power and generates additional heat. These are increasing important considerations especially in mobile computing applications. As it is expensive to engineer multiple execution units on the same die, it is currently normal for CPUs to have no more than two or three full floating point execution units. Thus, allocating even one execution unit to memory address generation represents a significant decrease in processing power for the CPU.

Modern applications, particularly in the field of image and sound processing, have placed further burden on the memory address generating process due to the high levels of data involved which may need moving each clock cycle.

Of interest to this invention is the field of medical imaging, and in particular, imaging a section, taken at an arbitrary angle, of a sample volume. In the medical imaging field, the accurate and automated delineation of anatomic structures from image data sequences requires heavy processing power when manipulation of a scanned volume is required. For example, image manipulation may be required after a scan is made using Magnetic Resonance Imaging (MRI), volumetric ultrasound or Positron Emission Tomography (PET) techniques. These techniques are non-invasive volumetric sampling techniques and brains, hearts, microscopic tissue sections are examples of the types of body volumes sampled by these methods.

The image of a scanned body volume is usually composed of many two dimensional (2-D) slices, or planes, of pixels taken at regular intervals producing a 2-D data set. The space between any two pixels in one slice is referred to as the interpixel distance, which represents a real-world distance. The distance between any two slices is referred to as the interslice distance, which represents a real world depth. Successive slices are stacked in computer memory based upon interpixel and interslice distances to accurately reflect the real-world sampled volume. Additional slices can be inserted between the dataset's actual slices, by various forms of interpolation, so that the entire volume is represented as one solid block of data at the appropriate resolution. Once the block of data has been established the pixels in each slice have taken on volume and are referred to as volume pixels, or voxels. In other words, a voxel is the smallest distinguishable box-shaped part of a three-dimensional (3-D) image. This 3-D data set is then a digital representation of the actual sample volume.

Image manipulation usually involves presenting the image of a slice of the sample volume taken at a user-defined angle through the body volume. Calculations need to be carried out to determine which image data points (the required data points) will show in the new viewing plane, and further calculations need to be carried out to determine at which memory addresses in the memory store the data representing the required data points resides.

Each required data point may actually comprise several bytes of data representing, for example, chroma, luminence and opacity parameters—each of these parameters can in turn comprise several bits representing a range of values. When an image slice of the sample volume is taken, the data corresponding to each data point on that single slice is stored at sequential memory addresses in the memory store. It is usual to store image slice data by means of a progressive scan whereby data corresponding to one corner of the 2-D image slice is recorded first, and recording ends at the diagonally opposite corner, having scanning progressively along each row until the entire image slice is captured. In order to obtain the memory addresses of the data corresponding to a single required data point, the two steps of first working out in three-dimensional physical space what co-ordinate the new data point will be before translating this into an actual memory address in memory space needs to be undertaken.

In order to present this new view with known microprocessor architecture, the CPU has to carry out the above two steps. As the view taken could be at any angle to the sample volume, it is unlikely that the data corresponding to the new view is stored in contiguous memory addresses in the memory store, as only views which represent a plane parallel to the plane of a scan slice will be stored contiguously. Due to the simple nature of known DMA engines the CPU either has to provide the DMA engine with every single memory address required or directly fetch each datum itself. This task represents a significant reduction in processing power of the CPU while it is tasked to carry out this calculation.

Other applications which require a similar level of memory address processing is include Z-buffering, ray tracing, occlusion matching and sound processing.

It is with a view to addressing the above problems, especially the problem of off-loading from the CPU intensive memory address generation processing that the following invention is presented.

According to one aspect of the present invention there is provided a method of generating a stream of non-contiguous memory addresses representing contiguous points in logical space, the method comprising: generating initialising parameters describing the contiguous points in the logical space; configuring a memory address engine with the initialising parameters; performing an algorithm in the memory address engine according to the initialising parameters to produce a plurality of non-contiguous memory addresses; and collating the non-contiguous memory addresses into the stream of memory addresses for output to a data memory.

By off-loading to an external memory address engine the job of calculating required memory addresses, the controller (which is commonly, but not always, the CPU) is freed to concentrate on processing data returned from the memory store. Furthermore, the controller only has to set the memory address engine once for a series of memory addresses to be computed, which means the controller is able to spend a higher percentage of its time in conducting processing tasks. More specifically, the data processing required by the controller CPU is limited to generating the initialising parameters, which typically comprise a few bytes as compared to the massive number of non-contiguous memory addresses which are generated by the memory engine as a result.

Another advantage of this invention is that historically memory address engines, such as DMA engines, have not been able to produce a continuous stream of memory addresses made of non-contiguous memory addresses without intervention from the controller or CPU. This invention, due to the algorithmic nature of processing the memory addresses, is able to produce this beneficial effect, thereby reducing controller input over known memory address engines.

Advantageously, the generation of the initialising parameters enables viewing of a logical plane of data taken at an angle through a volume of data, and it is also advantageous when generation of the series of parameters enables viewing of a portion of the logical plane of data. This is particularly true for viewing 2-D images of a 3-D volume.

Preferably the method comprises an algorithm which incorporates the steps of calculating memory addresses progressively for each data point on a row in a logical plane and repeating the above calculation for the number of rows in the logical plane. This regularity in processing elements of the logical space, enables the task of parameterising the contiguous points of the logical space for which memory addresses are required, to be simplified. Namely, the more regular the distribution of the processing elements describing the logical space, the more the address processing engine can carry out with minimal instructions from the controller.

Rather than computing memory addresses plane by plane in the real-world plane and only keeping the required memory addresses relating to data points in the logical plane, it is far more efficient to calculate memory addresses just for the data points in the logical plane.

Another advantageous feature of the claimed method is achieved if the configuring step incorporates specifying the co-ordinates of the initial data point in a logical plane, specifying a vector for a unit increase in a column of the logical plane, specifying a vector for a unit increase in the row of the logical plane and specifying column limits and row limits for the required data in the logical plane.

The above steps outline the basic recursive computational procedure for solving the problem of how to calculate only memory addresses relating to the required data points in the logical plane. These values comprise the core set of initialising parameters for the memory address engine and are a comparatively insignificant computation requirement for the controller as compared to the memory address calculation which they enable the memory address engine to carry out.

For the advantageous feature mentioned above, the step of specifying the co-ordinates of the initial data point on the logical plane may be carried out using Cartesian co-ordinates. Similarly, the steps of specifying the column vector and the row vector are preferably carried out using Cartesian co-ordinates. The logical plane is preferably representative of a plane through a real-world sample, and so each point in the logical plane can be represented by an appropriate co-ordinate. Also this means that as each of the co-ordinate axes as independent, the processing task can be carried out concurrently for each access at by the algorithm at the memory address engine.

As the logical plane could be inclined at any angle to the real-world Cartesian co-ordinate space, it follows that the vectors needed to traverse the rows and columns in the logical plane may have a component in each of these three axes.

It may be desirable for the method to further comprise the step of outputting the collated stream of memory addresses to a memory store, typically a Secondary Data Store. The Secondary Data Store can be any memory, for example main system memory.

In an alternative aspect to the claimed method, performing the algorithm preferably further comprises the step of checking whether a generated memory address is accessible to the memory address engine.

It is usual for memory address engines to have limits imposed on where in the memory space they can access. By access it is meant reading from, or writing to, that memory address. This can be due to efficiency reasons, e.g. dividing up the memory space between several memory address engines so that each one can work on a different range of memory addresses in parallel.

In the above alternative aspect, when performing the algorithm it is preferable that this comprises comparing a generated memory address to that of a predefined range of memory addresses accessible to the memory address engine. This simple check is all that is needed to prevent a waste of processing time in trying to retrieve data from a memory location which it is not possible for the memory address engine to access. In the event that such an address is detected, the performing step may further comprise returning a null result. This helps processing as the null result can be displayed for example as a frame around image data.

The present invention is more efficient when preferably there are a plurality of memory address engines. In this case, the configuring step may further comprise configuring at least one additional memory address engine with the generated initialising parameters, and the performing step may be carried out in each of the at least one additional memory address engines to produce the plurality of non-contiguous memory addresses.

Splitting memory address generating requirements amongst several memory address engines to process in parallel is a more efficient than only using one memory address engine. In the case of memory address engines working in single instruction multiple data (SIMD) mode, each memory address engine will be set with the same initialising parameters.

When using several memory address engines, it is preferable when performing the algorithm in each memory address engine that this incorporates determining whether a generated memory address is accessible to a neighbouring memory address engine.

In the case where it is accessible, then when performing the algorithm in each memory address engine it is also desirable that this further comprises generating a memory address on behalf of a neighbouring memory address engine.

These two feature enable the address calculation task to be distributed over an array of parallel memory address engines which each have access to their respective memory stores. The slight additional addressing issues are by far compensated for by the advantage of significant increases in speed.

For the abovementioned, preferably further comprises routing data returned from a memory store associated with a respective memory address engine as though it had been returned from a respective memory store of a neighbouring memory address engine when generating a memory address on behalf of a neighbouring memory address engine. In this way the destination of the data which may being obtained from a neighbouring data store can be correctly directed to the processor or store associated with the memory addressing engine from where the data was expected. This minimises changes in any data processing algorithm that operates on that data.

The routing step may further comprise excluding memory address data from being routed to the neighbouring memory address engine. This keeps the separation between data and addresses which is important for ease of operation and also minimises the number of input/output pins, which are required for silicon implementation of the routing function.

When generating a memory address on behalf of a neighbouring memory address engine it is preferable that this further comprises synchronising the data transfer with the neighbouring memory address engine. Whilst each memory address engine can work independently to a degree, when routing data to a neighbour, this is a universal change in the data flow for which it is highly advantageous that there is synchronisation between the engines.

In an alternative aspect of the present invention, there is provided a memory address engine arranged to accept initialising parameters describing contiguous points in logical space set by an external controller, the memory address engine comprising: an address generator arranged to generate a plurality of non-contiguous memory addresses according to at least one algorithm implemented on the initialising parameters; and collation means arranged to collate non-contiguous memory addresses into a stream of output memory addresses for output to a data memory.

According to another aspect of the present invention there is provided a memory address processing system comprising: at least a first and a second memory address engine, a first and a second primary data stores associated with the respective memory address engines, a first and a second secondary data store associated with the respective memory address engines, a databus connecting each memory address engine with its associated primary and secondary data stores, and a data router associated with each memory address engine, the data router associated with the first memory address engine being arranged to route data from the first secondary data store of the first memory address engine to a second primary data store of the second memory address engine upon instruction.

The above memory address processing system exploits the advantages of having a plurality of memory address engines to calculate the required addresses quickly. The address calculation is carried out on small subsets of the logical space and as such is considerably faster than if carried out on one large space. Rather than change the processing algorithms to deal with the new distributed structure, the provision of a router between two memory address engines makes the processing far easier.

In the above system, it is preferable that the instruction for the data router associated with the first memory address engine is sent from the first memory address engine. This keeps the control local and enables the memory address engine to specify when the data router is to route data to the controller directly from its own local data store and when it is to route data from its neighbouring memory address engine's local data store. The latter usually being required when the first memory address engine calculates that the memory address is not in its local data store.

According to another aspect of the present invention there is provided a router for use with a memory address processing system comprising a plurality of memory address engines, the router being arranged upon instruction from a first memory address engine to direct data from a memory store associated to the first memory address engine to a memory store associated to a second memory address engine.

Such a router has particular application when subdividing the task of memory address calculation such that many different processors and memory address engines are operating together. The route is not complicated because it can be arranged to route data in one of two configurations, either directly from the data store of the associated memory address engine or from the data store associated with the neighbouring memory address engine. Accordingly, each router can be fabricated in silicon relatively cheaply in terms of space and cost and provides a significant reduction in the computational overhead of the CPU having to work out which returned data is valid and represents which request.

Preferably, only memory data from the first memory store associated to the first memory engine is directed to a memory store associated to a second memory address engine. This allows the router to be simply constructed and repeated for each memory address engine.

In order that the invention may be more readily understood, the invention will now be described, by way of example, with reference to the accompanying drawings in which:

FIG. 3 is a representation of an arbitrary rectangular patch of voxel data orthogonal to the z-axis illustrating the different initialising parameters used in the processing system of FIG. 2;

FIG. 4 shows an example of a possible implementation of the present embodiment for determining MPEG programming calculations;

FIG. 7 is a table showing SDMC control and status registers of the second embodiment;

Figure 1:
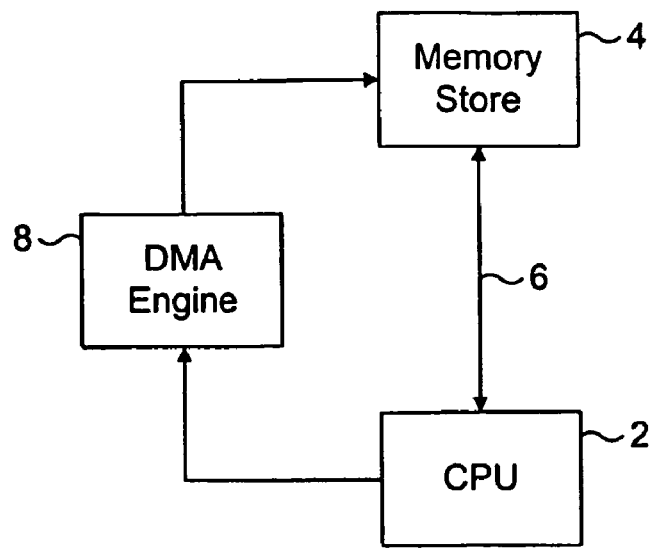
FIG. 1 is a schematic block diagram showing an example of a prior art DMA.

In FIG. 1 there is shown a simple prior art processing system comprising a CPU 2, a DMA engine 8 and a memory store 4. The CPU 2 is connected to the memory store 4 by a databus 6. The CPU transmits a memory address request to the DMA engine 8 which pages the memory store 4 to send data residing at that memory address to the CPU 2 for processing. The data sent from the memory store 4 may be collected in a memory cache (not shown) before the CPU is ready to process the data sent from the memory store.

Figure 2:
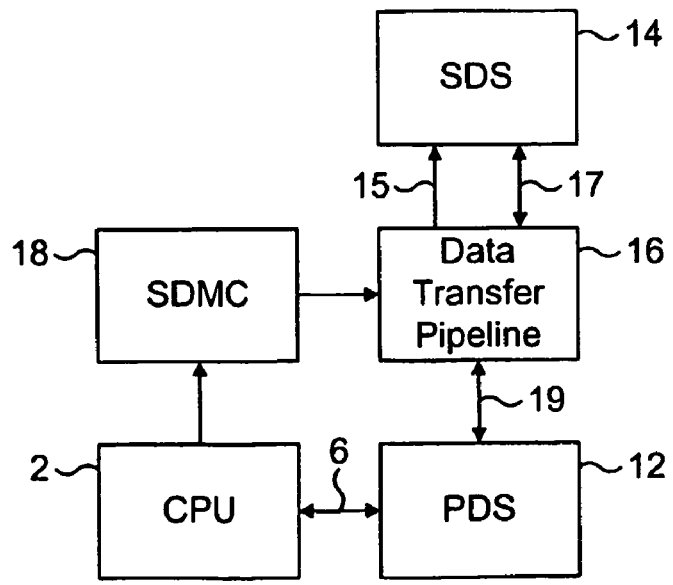
FIG. 2 is a schematic block diagram showing a processing system according to a first embodiment of the present invention.

FIG. 2 shows a processing system according to a first embodiment of the current invention. For ease of understanding, the differences between the first embodiment and the prior art are used to explain the first embodiment. The memory store 4 in FIG. 1 is replaced by a Secondary Data Store (SDS) 14 which is used to store very large 2-D or 3-D data sets. The SDS 14 is connected to a data transfer pipeline 16, which in turn is connected to a Primary Data Store (PDS) 12. The PDS 12 can be thought of as being a cache local to the CPU 2 or some other processor, such as an associated string processor (which is the subject of the Applicant's co-pending International patent application, published as WO 02/42906). The required 2-D or 3-D data sets are transferred into the PDS prior to processing by the processor associated with the PDS. The address generation in this network is handled by a smart DMA engine called a Secondary Data Movement Controller (SDMC) 18 which sends data address requests via the pipeline 16 to the SDS 14. The SDMC 18 is set up with address instructions from the CPU 2. The CPU which sets up the SDMC 18 does not necessarily have to be the same processor which is associated with the PDS.

In terms of memory hierarchy described earlier, the SDS can be any memory, or memory cache, lower down in the hierarchy compared to the PDS. Of particular importance to this particular invention is the scenario wherein the PDS is closely associated to a processor local to the SDMC 18, and in particular, wherein the processor is a vector processor.

The data transfer pipeline 16 is connected to the SDS 14 by pins 15 and 17 allowing simultaneous transmission of addressing data (pins 15) and data (pins 17). The data transfer pipeline also transfers data to the PDS, and the data bandwidth determines the number of pins present in connectors 17 and 19.

The SDMC 18 employs a Cartesian co-ordinate system with conventional x, y and z axes. The size and arrangement of the 3-D (volumetric) data set is defined by xSize, ySize and zSize. As previously described, the units are in voxels (the 3-D equivalent of pixels), which have a resolution/precision appropriate to the application. For example, the datum representing a voxel might comprise information about colour, density, transparency etc and would therefore occupy a plurality of bytes of storage (voxelSize). This would lead to a total 3-D dataset being comprised of the following number of bytes:

voxelSize*xSize*ySize*zSize bytes

The parameters xSize, ySize and zSize are not directly used by the SDMC architecture. Instead, users specify how many bytes in memory to skip in order to move a single voxel along each of the x, y and z axes. These quantities are called xScale, yScale and zScale. Typically (although not necessarily) the values of xSize, ySize and zSize would be identical.

One can interpret any 3-D data set as zSize planes each with dimension xSize by ySize. The 3-D data is conventionally arranged in the SDS with the first row (y=0) of the first plane (z=0) physically first in memory. The first data element in this first row is, naturally enough, the one at x=0, followed by x=1, up to x=xSize−1. This is followed by the second row of the first plane, and so on up until the last voxel of the first plane (x=xSize−1, y=ySize−1). From the last voxel of the first plane, one moves, naturally enough, to the first voxel of the second plane (x=0, y=0, z=1), and so on through the data set.

All of this could be expressed more concisely by stating that x is the minor dimension and z is the major dimension. The relationship between xSize, ySize and zSize and xScale, yScale and zScale follows from this:

xScale=voxelSize
yScale=xScale*xSize
zScale=ySize*yScale

The SDMC 18 facilitates the transfer of voxel data between the SDS 14 and the PDS 12. It internally calculates the co-ordinates (x,y,z) of each voxel to be transferred and multiplies these by the scale factors (xScale, yScale and zScale respectively) in order to determine the actual memory address of the voxel.

Many parallel processing applications invariably require neighbouring voxels to be loaded into neighbouring processing elements so that an array of execution units inter-connected by a communication network can be used efficiently to share neighbour data during common processing tasks, such as convolutions and matrix multiplication. Accordingly, the SDMC 18 is designed to transfer 2-D "patches of voxels" to and from SDS.

A "patch" is a rectangular arrangement of voxels all lying in the same arbitrary plane within the volumetric data set. This 2-D "patch of voxels" is not to be confused with a 2-D image—although under certain highly specific circumstances the two would be identical. The orientation of this plane can be arbitrary. In other words, locations and order of the voxels stored in the SDS involved in the transfer, are defined by an arbitrarily orientated rectangle conceptually positioned within the volume data. Most of the SDMC parameters are needed to specify of the position, size and orientation of this patch of voxel data within the volume data.

The patch of voxel data has a column dimension, and a row dimension. The column dimension is always the minor dimension i.e. data are transferred row by row—therefore the column index changes the most frequently during a transfer.

In use, the CPU 2 issues instructions to set up the SDMC 18 with a series of addressing instructions during initialisation, and by using an algorithm implemented in hardware described in detail later on, an example of which is described herein. The SDMC 18 is able to generate a series of required memory addresses which are then paged to the SDS and returned to the PDS. Hence memory address calculation is offloaded from the CPU to the SDMC 18, and the CPU is able to concentrate clock cycles on processing data taken from the PDS.

FIG. 3 shows a graphical example where a patch 20 of data items 21 (only a portion of data items 21 are labelled in FIG. 3) is chosen, for convenience of illustration only, to be aligned with the z-plane. In this example, the size of the patch is 3×3 data items.

The ColIncr is the vector required to calculate the address of the next data element along a row of the "data patch". The RowIncr is the vector required to calculate the memory address of the next data element in the next row. ColIncr and RowIncr each have three components, one each for the x, y and z directions (xColIncr, yColIncr etc). In the diagram, zColIncr and zRowIncr are obviously not represented, since the patch of voxels lies on a z-plane in this illustration.

However, in cases wherein the chosen plane is not parallel to the z-plane, each vector ColIncr and RowIncr will have a component in each of the three axes.

The plane chosen is referred to as the logical plane and the ColIncr and RowIncr vectors are vectors in the physical plane, which when taken together represent a unit vector in the logical plane.

The CPU 2 works out the x, y and z components for both ColIncr and RowIncr and this is sent to the SDMC 18 during initialisation and maintained throughout all the following calculations until all the data points for the patch of the required are calculated.

A more complete description of the controlling parameters is given in the following sections.

xInit, yInit, zInit

The position of the rectangular patch of voxel data 20, or matrix, is determined by the x, y, z co-ordinates of its first voxel (the voxel with the minimum column and row co-ordinate within the matrix). This position is specified by the SDMC parameters xInit, yInit and zInit. The values of xInit, yInit and zInit are 32-bit signed fixed point values, with the lower 16 bits representing the fractional part.

ColIncr and RowIncr

The orientation of the rectangular patch 20 is specified by two vectors, ColIncr(x,y,z), and RowIncr(x,y,z). The ColIncr is the vector required to move to the next data element along a row of the rectangular patch 20. The RowIncr is the vector required to move from a row to the next row. ColIncr and RowIncr each have three components, one each for the x, y and z directions (xColIncr, yColIncr etc). These components are 32-bit two's complement fixed point value, with the most significant 16 bits representing the integer part and the least significant 16 bits representing the fractional part.

ColLimit and RowLimit

The number of source/destination data elements within the patch (and hence the size) is specified by ColLimitL, ColLimitH, RowLimitL and RowLimitH. These specify the begin and end limits of the internal SDMC row and column counters, used to traverse the data elements defined by the rectangular patch 20, i.e. the column counter counts from ColLimitL to ColLimitH and the row counter from RowLimitL to RowLimitH. In this manner, a subset of the chosen patch may be transferred at the user's discretion.

The above three sets of parameters, the initial values of the starting voxel, the unit increment vectors in the logical plane and the logical plane limits are all that are needed to specify the patch of data in the logical plane. Further optional parameters may be provided to increase the functionality of the SDMC.

For example, the SDMC 18 does not have to transfer complete "patches (or rectangles) of data", the actual number of data elements to be transferred is specified by TfrLength (transfer length). TfrLength may be less than the number of data elements defined by RowLimit and ColLimit, or more probably it will be the same or an integer multiple of this value (enabling multiple copies of the rectangular patch's data to be transferred to the PDS during load operations).

Another example is providing programmable parameters RowBound, ColBound and NullData. It is often the case that only a subset of a patch of data from the SDS is required to be extracted, whilst padding the remaining data items with some arbitrary NULL value. The SDMC 18 has additional functionality to help select only this subset data from the SDS and fill the remaining locations with NULL data to be transferred to the PDS.

Similarly, the processing of a patch of data may result in invalid results being stored back into the local PDS (i.e. at the boundaries of a patch after processing). Rather than waste computational bandwidth in the CPU 2 to suppress the generation of these invalid results (not practical or desirable in a SIMD processor) it is better to write back only the valid results back to the SDS after processing, discarding any invalid boundary data.

Data is only transferred between PDS and SDS when the internal SDMC column count is >=ColBoundL and <=ColBoundH and internal SDMC row is count is >=RowBoundL and <=RowBoundH i.e. RowBoundH, RowBoundL, ColBoundH and ColBoundL mark the bounds of the internal row and column counters within which valid data is transferred. When either the row or column counters exceed their respective bounds, the NULL data value is loaded into the PDS during a load operation. During a store cycle the PDS data is discarded and no data is written to the SDS. The NULL data value is specified by the NullData SDMC parameter.

FIG. 4 shows an example in MPEG video decoding, where an IDCT (inverse discrete cosine transformation) must be carried out on an 8×8 matrix, the result of which (also an 8×8 matrix) must be added to reference data produced from a 9×9 matrix by half pixel interpolation. One approach might employ 81 SIMD processing elements to handle the computation instead of 64, to allow enough room to load the 9×9 reference data over the IDCT results without needing to make any extra space first. In this situation, one would want to load the entire IDCT input data (64 data elements) in one transfer into 81 Associative Processing Elements. However in order to facilitate the ensuing matrix multiplications we would require that each row of 8 from the input data to be left aligned in a row of 9 in the SIMD processor array, with a final blank row of 9 at the "end".

This can be easily achieved with the SDMC 18 by appropriate specification of the RowBounds and ColBounds parameters. For the MPEG example the following could simply be set ColLimitL=RowLimitL=0, and ColLimitH=RowLimitH=8 and RowBoundL=ColBoundL=0, RowBoundH=ColBoundH=7, remembering to set TfrCount to 81.

Figure 5:
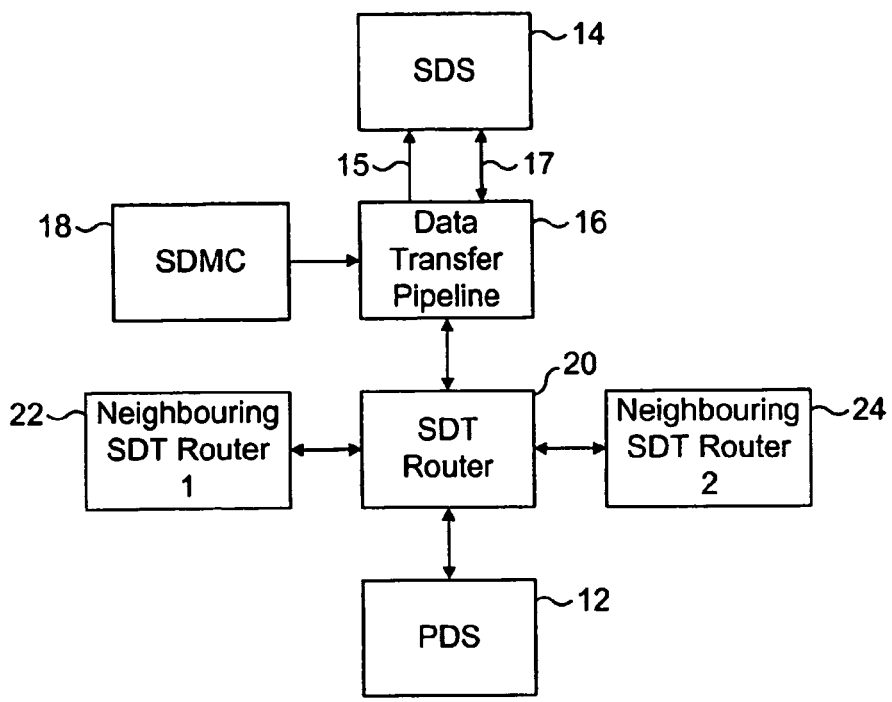
FIG. 5 is a schematic block diagram showing second embodiment of the present invention which comprises a Secondary Data Movement Controller (SDMC) with primary data store and router.
Figure 6A:
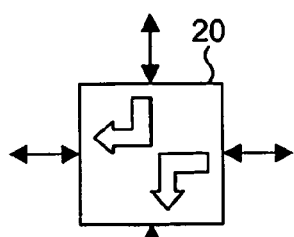
FIGS. 6a to 6d are schematic diagrams showing possible router configurations of the router shown in FIG. 5.
Figure 6B:
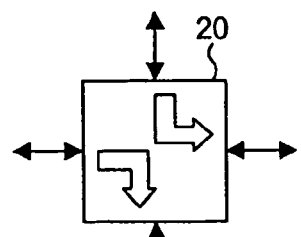
Figure 6C:
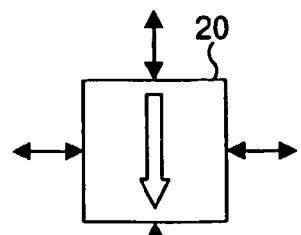
Figure 6D:
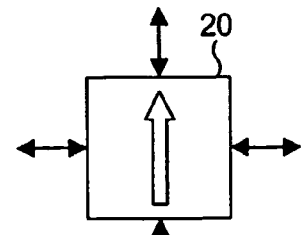

With an array of SDMCs processing data in parallel, in a Single Instruction Multiple Data (SIMD) mode, a second embodiment of the invention, represented by the processing system shown in FIG. 5 can be employed. In this parallel configuration, a Secondary Data Transfer (SDT) router 20 is positioned between the pipeline 16 and the PDS 12. When the CPU sets up the SDMC 18 with initial instructions, the CPU also lets the SDMC 18 know which series of memory addresses each SDMC 18 can access.

If, during the course of a first SDMC 18 processing the queue of addressing instructions initialised by the CPU the SDMC 18 finds that the memory address generated is outside its own allocated local series of memory addresses, the SDMC 18 determines which neighbouring SDMC is able to access this memory address and the router accordingly sets itself to route data from a neighbouring SDMC's router (22, 24) to the PDS of the first SDMC 18 via the first SDMC's router 20.

It is important to remember that the SDMC programming parameters enable a global voxel address to be calculated. The global data set may be distributed across multiple local SDS's, each with their own SDMC and secondary I-O channel to PDS, thereby offering enhanced secondary I-O (input-output) performance. Many SIMD applications will work by simply partitioning the data into multiple independent data sets in this way.

However, benefit comes from the ability of neighbouring SDMC channels to have physical access to each other's local data whilst retaining a global addressing scheme to enable them to reference data throughout the system SDS. Invariably this assumes local data sets with equal sizes and shapes and data accesses restricted to neighbouring SDSs—a reasonable and cost-effective assumption in SIMD 2-D and 3-D imaging applications.

Therefore the "channel" architecture allows a particular SDMC 18 to effectively read data from one of its nearest neighbour's SDS. The SDMC 18 in question does not directly fetch the data itself, but utilises the neighbour's SDMC to undertake the fetch. In other words, each SDMC issues a global address and fetches the data. However the SDMC, recognising that this data is actually in a neighbouring SDS, applies an appropriate offset to its own global address to create a local address and routes the resulting data transfer to its neighbour via a simple neighbour switching network.

In practice this relies on all SDMC channels requiring access to neighbouring SDS data at the same point in the program, so that they are all fetching data from their local SDS on behalf of a neighbour. This is undertaken by employing a handshaking channel between neighbouring SDMCs. In an array of SDMCs working in SIMD mode, each SDMC 18 may be at a slightly different place in the queue of addressing instructions it has been initialised to process. As each SDMC 18 is operating the same set of instructions, albeit on a different portion of data, as soon as one SDMC 18 realises the address generated is outside its local data store it sends a handshaking signal to neighbouring SDMCs. As soon as every SDMC has reached the same position, and realised that the next address is outside their local SDS, the routers are activated and the each SDMC processes the address page of the appropriate neighbour, and the router routes the returned data to that neighbour's PDS.

The handshaking process is critical to the above scenario as in SIMD processing architecture if one SDMC requires data held in a neighbouring SDS, then all the processing units will as well. This transfer cannot take place until all the processing units are synchronised at the same stage in the queue of processing instructions.

This embodiment not only shows the scalability of the present invention but how, with the router, the size of the local data stores for each SDMC can be reduced. Without the router function, each SDMC will need to have an accessible local memory store of the same size as the entire SDS which is costly.

Furthermore, the positioning of the router between the data transfer pipeline 16 and the PDS 12, and not between the pipeline 16 and the SDS 14 means that significantly fewer signals need to be provided. It is clear from FIG. 5 that the router only needs to provide enough pins to enable the data to be transferred to is the PDS 12, whereas situating the router between the pipeline 16 and the SDS 14 will necessitate providing additional pins to transmit the addressing data as well. The placing of the router as shown in FIG. 5 considerably reduces the number of connections—i.e. the pin count—needed in the processing system. This equates to an appreciable reduction in circuit board real estate, cost and power consumption.

In practice, router activation as shown in FIG. 5 is controlled by setting parameters WrapBase and WrapLimit. WrapBase and WrapLimit are used by the SDMC 18 to modify the global position vector, which may refer to a physical location in a neighbour's SDS, so that it always points to a corresponding position within the local SDS. The router enabling bits must be set in the SDMC function register for a transfer that requires this functionality, the routers must be enabled independently for accesses that exceed the bounds of the local SDS in each of the x, y or z directions.

WrapBase and WrapLimit also specify what subset of the global SDS a particular SDMC's SDS occupies—i.e. defines the local SDS particular to each SDMC 18. WrapBase (xWrapBase, yWrapBase and zWrapBase) specifies the global voxel co-ordinate corresponding to the first voxel in the local SDS. WrapLimit (xWrapLimit, yWrapLimit, zWrapLimit) specifies the number of voxel steps that can be taken along each axis before the limit of the local SDS is reached.

If the volume is divided across multiple local SDSs (each with their own SDMC 18 and secondary I-O channel to PDS), the xInit, yInit and zInit values must be supplied relative to the xWrapBase, yWrapBase and zWrapBase values of a given data channel If the required memory address of a first SDMC 18 is larger than WrapLimit then the required address is subtracted from the WrapLimit and the first SDMC 18 is set to return from the first SDMC's local SDS the address of the neighbouring SDMC with a lower local range of memory addresses, and this data is routed to the neighbouring SDMC's PDS by routing through both the first and neighbouring SDMC's routers. The data required by the first SDMC 18 will be returned to the first SDMC's PDS by the other neighbouring SDMC through the other neighbouring SDMC's router and the first SDMC's router.

Conversely, if the required memory address is smaller than WrapLimit then the required address is added to the WrapLimit and the first SDMC is set to return from its local SDS data that will be routed to a neighbouring SDMC with a local SDS range higher than its own.

FIGS. 6a to 6d show the routing configurations for router 20 supported under this scheme. Note that in the example shown, the router 20 only operates during data load cycles (i.e. SDS to PDS transfers). This is because in this example the scheme anticipates that a given processor will try to access "overlap" data from neighbouring data sources, but will generally only use this to calculate local results (i.e. store to its own local SDS). This restriction need not always apply in the general case.

Other parameters that may be set by the algorithm (implemented in hardware) are upper and lower limits for hard bounds checking—HardBoundH and HardBoundL. The SDMC 18 provides bounds checking for the addresses that it calculates so that data can be prevented from being read from or written to invalid locations. This is particularly useful for applications that divide their data sets over multiple SDS channels and employ neighbour data accesses. In this situation, the channels containing the "ends" of the data set will inevitably generate addresses which lie outside of the global data set.

HardBoundH (xHardBoundH, yHardBoundH and zHardBoundH) and HardBoundL (xHardBoundL, yHardBoundL and zHardBoundL) specify the "hard" boundaries imposed on the global position vector calculated by the SDMC 18. When the hard bound is exceeded no memory read or write accesses are generated and the NullData value is returned in place of read data.

Figure 8:
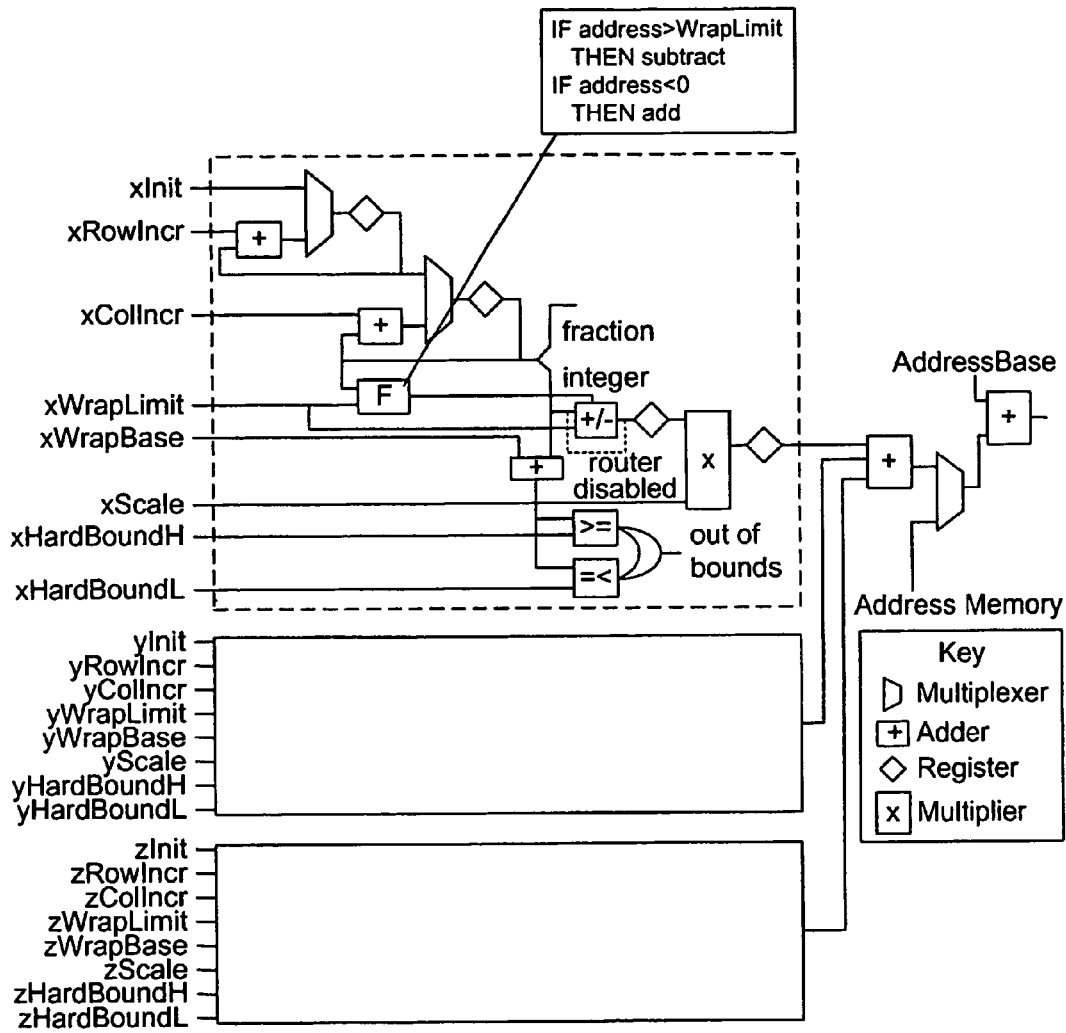
FIG. 8 shows detailed architecture of the SDMC of FIG. 5.

The SDMC 18 referred to in FIGS. 5 and 6 has the configuration registers as shown in FIG. 7. The AddressBase referred to in FIG. 8 is the offset of the data set from the start of the local SDS. This represents a simple offset within the SDS store and has no special relationship with the 2-D or 3-D data set size or its co-ordinate system.

The detailed architecture of the SDMC 18 for use in the second embodiment as referred to in FIGS. 5 to 7 is shown at FIG. 8.

Whilst this SDMC is specifically with reference to the second embodiment, it can readily be adapted for use with the first embodiment.

There are three main units to the circuit shown in FIG. 8 which, in turn, are responsible for generating the x, y and z components of each of the logical plane vectors RowIncr and ColIncr. To recap above, RowIncr and ColIncr relate to unit vectors in the logical plane and as the logical plane can be at any angle to the real-world sample being viewed, RowIncr and ColIncr can have components in all three axes. Detailed circuitry is only shown for the unit responsible for calculating the x component in each vector calculation of RowIncr and ColIncr, although the other two units will comprise exactly the same components. In operation all three units run at the same time to generate a single resulting memory address comprising outputs from all three units.

A counting mechanism, referred to as a patch index logic circuit (not shown), provides the clocking signals driving the x, y and z component processing units, and this can be readily achieved by known methods. This counting mechanism indexes through the columns and rows of the logical plane to keep track of how many columns and rows have been processed and to stop processing when the column limits and row limits have been arrived at.

The following is described with reference only to the unit responsible for calculating the X component. Exactly the same process is followed in the other Y component and X component units. Upon an appropriate signal from the counting mechanism the xColIncr multiplexer starts adding ColIncr, which is one of the parameters initialised at the start of the operation.

The principal module for calculating the global address in $\{x, y, z\}$ parameter space utilises 32-bit fixed-point arithmetic for the application of the RowIncr and ColIncr offsets. In order to implement the concept in the most efficient manner, the invention supplies the Init (x, y, z) values per channel relative to the local WrapBase (x, y, z). In this manner all address calculations are actually made for the local SDS memory, but may readily be recast into the global address space (i.e. for hard bounds checking) by simply adding the WrapBase offset to the local address.

For applying the wrap offsets, the integer portion of the address (which is relative to the WrapBase) is compared to the WrapLimit. If the address is greater than the WrapLimit or less than 0, then the router will be enabled to redirect data to either the right or left neighbouring PDS' respectively. Under these conditions, since the address is not directed via the router, but remains strictly local, it must be modified to provide the local address for the neighbour routed data. If the address is greater than the WrapLimit, then WrapLimit is subtracted to calculate the local address. If the address is negative then it is summed with WrapLimit, again to calculate the local address.

Alternatively, if no router network is needed, then the global address is passed unmodified to the Scale multiplier.

Next the hard bounds check is performed. The address is first summed with WrapBase to calculate the global address, then compared to the HardBounds limits.

Subsequently, and in order to allow for non-unity voxel sizes, the address is then multiplied by the Scale factor.

Finally the x, y and z components are combined to generate the final SDS address. In these final stages the AddressBase offset is applied.

These steps are repeated for every data point in each row of the logical plane. When the end of a row is reached, the counting mechanism sends a different signal to the xRowIncr multiplexer to add RowIncr to the address value calculated in that clock cycle for xColIncr.

Once this has been added the rest of the procedure remains the same. Point by point, and row by row, this procedure is followed until all the points in the required logical plane, or patch of the logical plane, are calculated.

There is provision, by way of the multiplexer just before the AddressBase summation, for an alternative source of memory addresses to supply the memory address at this stage—this is represented by the term AddressMemory. However, this is only present in this figure to demonstrate the flexibility with the present design and provide greater compatibility with existing network designs. As an example, addresses generated by the address generating logic of the SDMC 18 prior to multiplexing with the AddressMemory multiplexer can be substituted by addresses generated by an associative processor, or an array of associative processors, which instead generate the memory addresses and supply these to the local SDS. As an associative processor is a vector processor the memory addresses generated would be dumped into a further register or cache (not shown), before being streamed into the multiplexer, as memory addresses can only be handled by the memory store linearly. It is possible for an array of associative processors to dump memory addresses into this register or cache before the addresses are streamed to the multiplexer.

Figure 9:
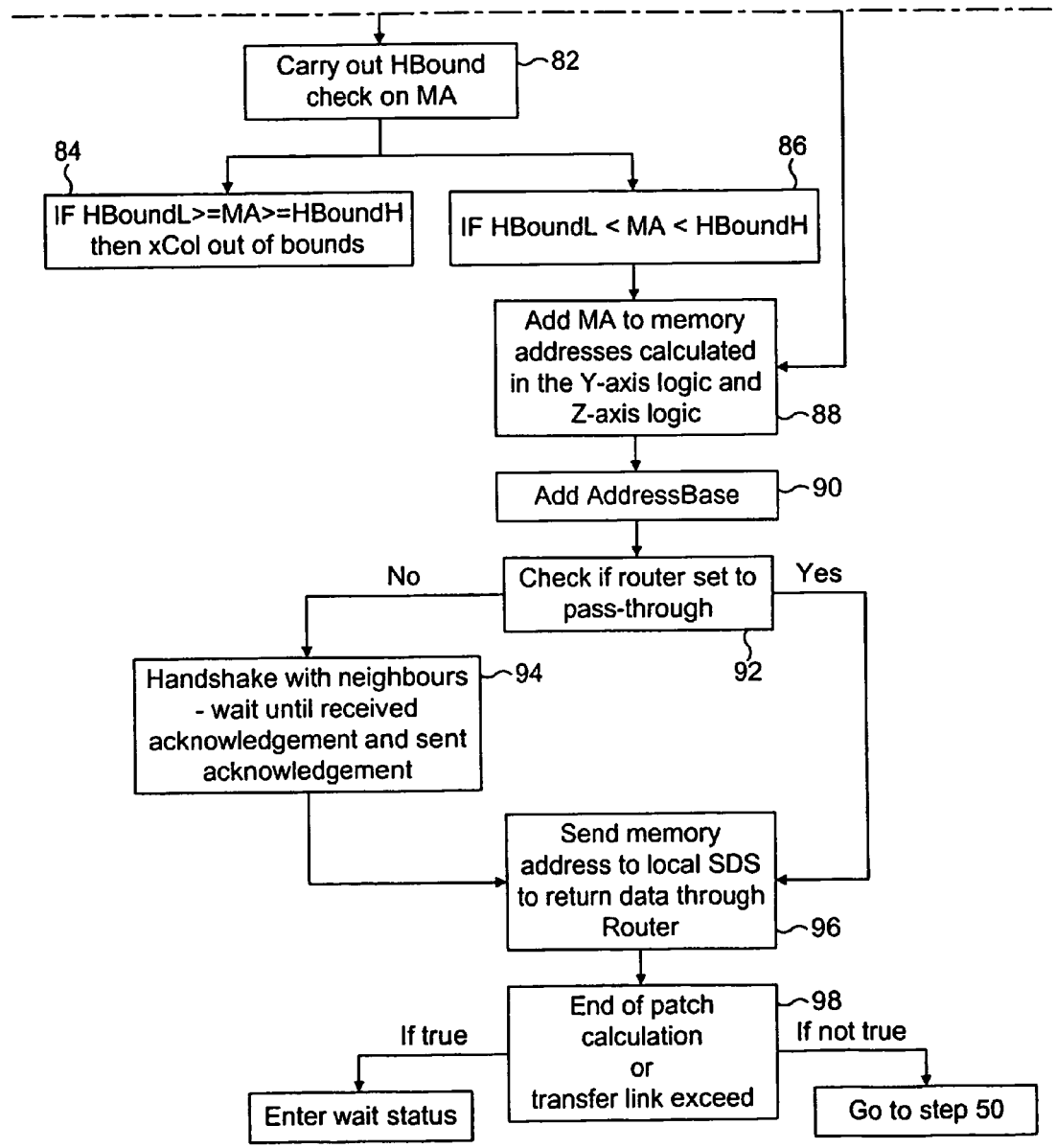
FIG. 9 is a flow diagram of a data path utilised in architecture shown in FIG. 8.

This process is represented by the flow diagram shown in FIG. 9, which only shows the process for one of the co-ordinate axes—in this case the X axis. As will be shown in the description of this process, at a later point the memory addresses calculated in all three axes are summed to produce the final global memory address.

The co-ordinates of the first point on the logical plane patch, xInit, yInit and zInit are already known and stored during initialisation. The process shown in FIG. 9 begins at step 50 which requires a decision on whether a new row of data points is to be calculated. If yes, the patch index logic adds RowIncr to the value in the xRow register and the new value is stored in the xRow register. This is represented by the sequence of steps 52, 54 and 56. If the decision at 50 was that a new row on the logical plane is not being started, then the process jumps directly to step 58, wherein the xCol register value is modified by adding xColIncr—shown by steps 58 and 60.

In practice as the points on the logical plane are calculated row by row, it is the column increment vector, xColIncr which will be increased the most times. XRowIncr is only added to the xRow register value at the start of each new row on the logical plane patch.

For each data point the xRow register value and the xCol register value are added together at step 60 to form the MemoryAddress (MA). The MA has the fractional part discarded at step 62.

Next, the remaining integer part of MA is compared to the WrapLimit (WL) at step 64. There are three outcomes to this comparison step—MA is less than 0, MA is greater than WL or 0<MA<WL. The respective three outcomes are labelled 66, 68 and 70.

If 66 is true then the Router is set to route to the PDS local to the neighbouring SDS with a lower accessible memory address range than the present SDS—this is shown at 72. Should 68 be true then the router is set to route the neighbouring SDS with a higher accessible memory address range than the present SDS—as shown at 74. It will remembered from FIGS. 6a and 6b that when the router is set to route data to a neighbouring PDS, via the neighbouring router, the router at the same time sets up to be able to receive into the local PDS data returned from the other neighbouring router.

If the router is not activated at all, because the condition 0<MA<WL is true (step 70), then the router is set to pass-through mode at 76 and the MA is sent directly to the adding step at 88.

Referring back to 72 and 74, after 72 the MA (which is still a global MA) is added to the WL to produce a modified local MA 78, and after 74 the WL is subtracted from the global MA to produce a modified local MA 80.

The MA following from 78 or 80 will then pass through a HardBounds check step 82, and if HBoundL>=MA>=HBoundH is true then the modified local MA is out of bounds (step 84). In all other cases 86 holds true and the MA passes to 88 wherein it is added to the MemoryAddresses generated by the corresponding Y-axis and Z-axis logic.

After 88 the AddressBase (AB) is added to the memory at step 90, wherein after that is a check step 92 to see if the router is set to pass-through. If the router is set to pass-through then the MA is sent to the local SDS to return data through the router at step 96, which in this case will return data to the local PDS.

Should the router not be set to pass-through, then a handshaking step is activated at 94 wherein each SDMC will wait until the neighbouring SDMCs are ready and synchronised for inter-SDMC data transfer through respective routers. This handshaking step is described in more detail below.

Once the handshaking step has been completed the MA is sent to the local SDS to return data through the router at step 96, and in this case the data will be returned to a neighbouring PDS.

After data has been received by the PDS at 98 the process will restart at step 50 unless either the end of the patch has been reached, or the transfer length has been exceeded, in which case the SDMC will enter a wait state.

The handshaking step mentioned above is meant to ensure that all SDMCs transfer data between them in synchronicity. As stated before, in a SIMD scenario only this method will work. Each SDMC, when it has realised that a transfer of data from its local SDS to a neighbouring PDS is required, sends a notification signal to the neighbouring SDMC to which it intends to route data to. At the appropriate time the neighbouring SDMC will detect the notification signal and return an acknowledgement signal. At the same time, the other neighbouring SDMC will have sent the first SDMC a notification signal and will be expecting to receive an acknowledgement signal. Thus, as soon as the first SDMC has received an acknowledgement and has sent an acknowledgement signal it knows that it is ready to initiate the inter-SDMC data transfer at the next clock cycle.

During that clock cycle all the SDMCs in the array will have settled down and be ready and waiting to initiate inter-SDMC data transfer. Of course the amount of time taken to complete the handshaking process will increase with the number of SDMCs employed in the array—in the case where there are too many SDMCs to be able to complete handshaking in the space of one clock cycle, the controlling CPU can be notified of this and allow as many clock cycles as necessary to pass, in order to complete handshaking for all SDMCs, before allowing inter-SDMC data transfer.

For the SDMCs at the ends of arrays there is a link to enable handshaking between the two end SDMCs so that, in effect, with regards to the handshaking step there is a circle of SDMCs as opposed as a line with a starting and ending SDMC.

Figure 10:
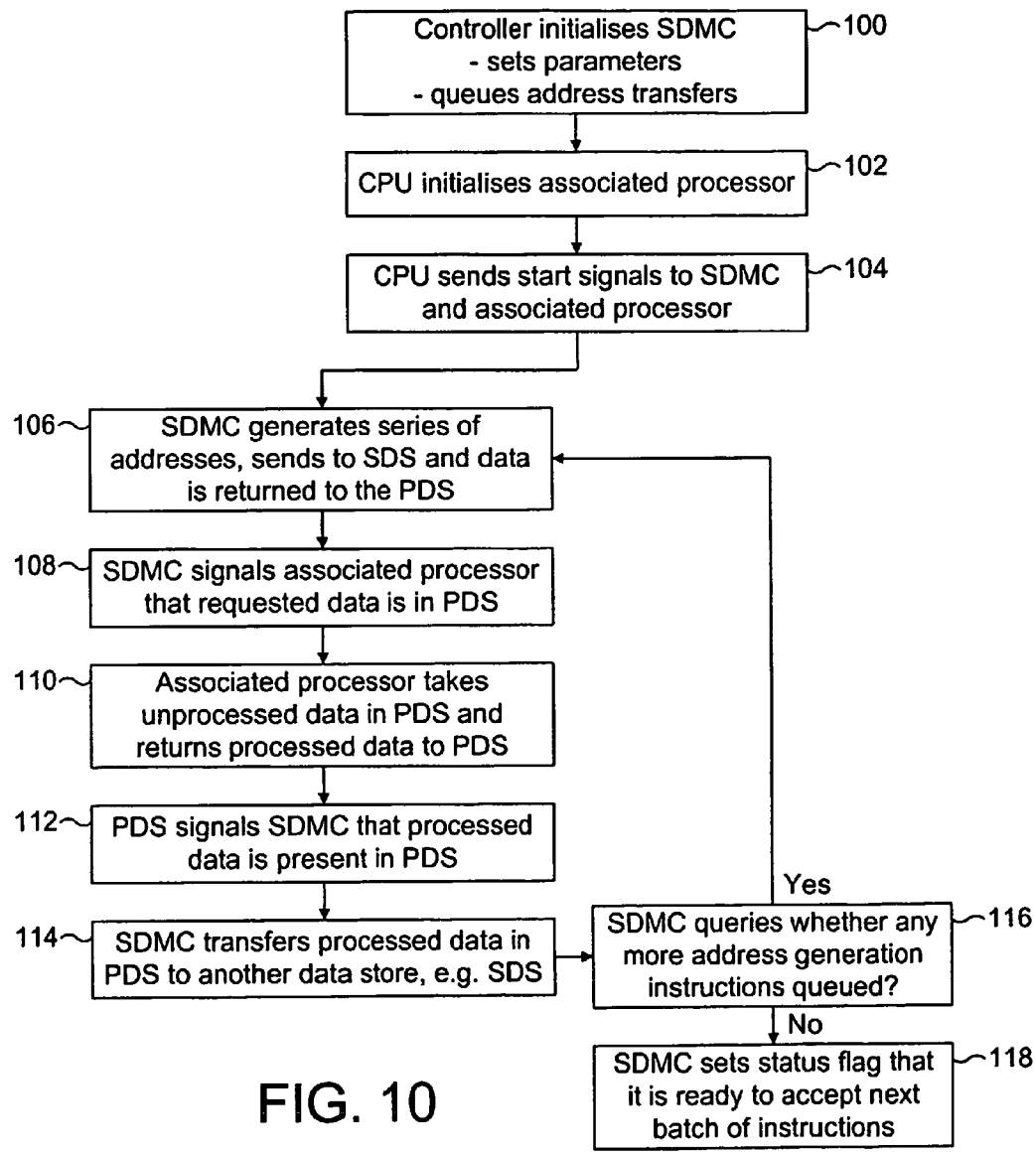
FIG. 10 is a flow diagram of the process used in an alternative embodiment of the invention comprising a SDMC with an associated processor.

In a further embodiment of the present invention, the hardware configuration is similar to the second embodiment, except the SDMC 18 is connected to an associated parallel processor. The operation of the processing system of the third embodiment is represented by the flow diagram shown in FIG. 10. At initialisation by the CPU, the CPU sets both the SDMC 18 and the associated processor with initial instructions as shown at steps 100 and 102 respectively. The SDMC 18 is set with a series of memory address transfers and also the parameters needed to carry out these memory address calculations—step 100. At step 102 the associated processor is set with a queue of processor functions—analogous to procedure or function calls in a conventional processor language scenario. When the initialisation stage has been completed the CPU sends a start signal at step 104 and the SDMC 18 starts to process the queued memory addresses and outputs each memory address to the local SDS at step 106 and notifies the associated processor that the requested data is present in the PDS at 108. After the processor processes the data in the PDS it returns the processed data to the PDS again (step 110) and notifies the SDMC at 112 that processed data is present in the PDS ready for the SDMC to move it somewhere else. In this case the SDMC moves the data back to the SDS at step 114.

After each batch of data has been processed the processor handshakes with the SDMC queries whether it has remaining instructions to carry out at 116. If it does, the process loops back to 106 to continue the processing cycle. Once the SDMC runs out of further instructions to process it sets a status flag at 118 that it is ready to accept the next batch of instructions. As is apparent this setup has inherent scalability built in.

Other scenarios not described include those wherein the associated processor processes data and dumps data into the PDS for the SDMC to move to another data store, without ever needing the SDMC to process data and move it to the PDS in the first place. An alternative scenario is one whereby the SDMC is only required to process and move data to the PDS without being required to move data out of the PDS.

In the described scenario of a SDMC 18 closely associated to a processor, and in particular a parallel processor, further benefits of the invention can be realised. It is important for the parallel processor that the required data is ready for loading into the processor's registers at the required time, and by employing a SDMC 18 to move data into the PDS connected to the registers, there is enough data present in the PDS to enable the processor to operate at full speed, without having to wait for data to be made available in the PDS.

The parameters mentioned above are hardwired into the SDMC 18 to perform the algorithm described. In the present embodiments the application of this SDMC 18 is particularly applicable for manipulating 2-D and 3-D images. Of course, other algorithms more suited to alternative applications of the SDMC 18 mentioned elsewhere may utilise different hardwired parameters. It is evident from the foregoing description that any large dataset which requires a set of vector instructions applied to the dataset is particularly applicable to this invention by breaking down the dataset into a series of smaller fragments, allocating each fragment of data to an individual SDMC 18 (and the associated SDS), and setting each SDMC 18 with the initialising parameters.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, the present invention is not restricted to SIMD technology and can be applied to any data-parallel processor technology.

The invention claimed is:

1. A method performed within a computer system for generating a stream of non-contiguous memory 'READ' addresses representing contiguous points in a selected planar surface within a multiplanar image, the method comprising:
   generating, at a CPU of the computer system, initializing parameters mathematically defining an array of contiguous image data points within the selected planar surface of the multiplanar image, the initializing parameters including a plurality of parameterization unit vectors and spatial-coordinate boundary values;
   configuring a memory address engine with the initializing parameters;
   performing an algorithm within the memory address engine according to the initializing parameters to calculate the set of contiguous image data points in image space comprised within the selected planar surface;
   producing a plurality of non-contiguous memory addresses within the memory address engine using the calculated set of contiguous image data points for use in a subsequent memory 'READ' operation; and
   collating the non-contiguous memory addresses into the stream of memory 'READ' addresses for output to a data memory to perform the subsequent memory 'READ' operation.

2. The method of claim 1, wherein generating the initializing parameters enables viewing of the selected planar surface representing an image of a sectional view through the multiplanar image.

3. The method of claim 2, wherein generating the initializing parameters further enables viewing of a portion of the multiplanar image.

4. The method of claim 1, wherein the performing the algorithm within the memory address engine includes:
   calculating memory addresses progressively for each image data point on a row in the selected planar surface; and
   repeating the above calculation for the number of rows in the selected planar surface.

5. The method of claim 4, wherein generating initializing parameters comprises:
   generating an initial spatial-coordinate value of an image data point on the selected planar surface;
   generating a plurality of unit vectors defining unit increases for image data points comprised within each of the column and rows of the selected planar surface; and
   generating the spatial-coordinate boundary values defining the column and row limits for the required image data on the selected planar surface; and
   wherein configuring the memory address engine comprises:
      specifying the spatial-coordinates of the initial image data point on the selected planar surface;
      specifying a column unit-vector for defining a unit increase in each column of the selected planar surface;
      specifying a row unit-vector for defining a unit increase in each row of the selected planar surface; and
      specifying the column limits (ColLimitL, ColLimitH) and the row limits RowLimitL, RowLimitH) for the required image data on the selected planar surface.

6. The method of claim 5, wherein specifying the spatial-coordinates of the initial image data point on the selected planar surface is carried out using Cartesian coordinates (XInit, yInit, zInit).

7. The method of claim 5, wherein specifying the column unit-vector and the row unit-vector are carried out using Cartesian coordinates (ColIncr(x,y,z), RowIncr(x,y,z)).

8. The method of claim 1, further comprising outputting the collated stream of memory addresses to a memory store.

9. The method of claim 1, wherein producing the plurality of non-contiguous memory addresses further comprises checking whether a generated memory address is accessible to the memory address engine for the 'READ' operation.

10. The method of claim 9, wherein producing the plurality of non-contiguous memory addresses further comprises comparing a generated memory address to that of a predetermined range of memory addresses accessible to the memory address engine for the 'READ' operation.

11. The method of claim 9, wherein producing the plurality of non-contiguous memory addresses further comprises returning a null result if the generated memory address is not accessible to the memory address engine for the 'READ' operation.

12. The method of claim 1, wherein a plurality of memory address engines are arranged to be operated in a Single Instruction Multiple Data (SIMD) configuration and configuring the memory address engine further comprises configuring at least one additional SIMD memory address engine with the generated initializing parameters, and wherein the algorithm is performed and the plurality of non-contiguous memory addresses are produced in each of the at least one additional SIMD memory address engines.

13. The method of claim 12, wherein producing the plurality of non-contiguous memory addresses incorporates determining whether a generated memory address is accessible to a neighboring SIMD memory address engine.

14. The method of claim 12, wherein producing the plurality of non-contiguous memory addresses further comprises calculating a memory address on behalf of a neighboring SIMD memory address engine.

15. The method of claim 14, further comprising routing data returned from a memory store associated with a respective SIMD memory address engine as though it had been returned from a respective memory store of a neighboring SIMD memory address engine.

16. The method of claim 15, wherein routing data further comprises excluding memory address data from being routed to the neighboring SIMD memory address engine.

17. The method of claim 15, further comprising synchronizing the data transfer of the SIMD memory address engine with that of its neighboring memory address engine.

18. A memory address engine adapted to accept initializing parameters set by an external controller, the memory address engine comprising:
- an address generator arranged to generate a plurality of non-contiguous memory addresses according to at least one algorithm implemented on the initializing parameters; and
- collation means arranged to collate the plurality of non-contiguous memory addresses into a stream of output memory 'READ' addresses for output to a data memory to perform a subsequent memory 'READ' operation;
- wherein the initializing parameters define an array of contiguous image data points in a selected planar surface of a multiplanar image by a plurality of parameterization unit vectors and spatial-coordinate boundary values.

19. The memory address engine of claim 18, wherein the algorithm is implemented in hardware as part of the address generator.

20. The memory address engine of claim 18, wherein the address generator comprises:
- means for calculating memory addresses progressively for each image data point on a row on the selected planar surface; and
- means for repeating the above calculation for the number of rows in the selected planar surface.

21. The memory address engine of claim 18, wherein the address generator is arranged to process received initialization parameters describing the spatial-coordinate value of an initial image data point on the selected planar surface, a column unit-vector defining a unit increase in each column of the selected planar surface, a row unit-vector defining a unit increase in each row of the selected planar surface, and the spatial-coordinate boundary values defining the column and row limits for the required image data.

22. The memory address engine of claim 21, wherein the address generator is arranged to process at least some initialization parameters specified in Cartesian coordinates.

23. The memory address engine of claim 18, further comprising access means for determining whether a generated memory address is accessible to the memory address engine for the 'READ' operation.

24. The memory address engine of claim 23, wherein the access means is arranged to compare a generated memory address to that of a predetermined range of memory addresses accessible to the memory address engine for the 'READ' operation.

25. The memory address engine of claim 23, wherein the access means is arranged to return a null result if the generated memory address is not accessible to the memory address engine for the 'READ' operation.

26. The memory address engine of claim 23, wherein the access means is arranged to determine whether a generated memory address is accessible to a neighboring memory address engine.

27. The memory address engine of claim 26, wherein the access means is arranged to calculate a memory address on behalf of a neighboring memory address engine.

28. The memory address engine of claim 18, wherein the address generator comprises an associative processor.

29. The memory address engine of claim 18, wherein the address generator comprises an array of associative processors.

30. The memory address engine of claim 28, wherein the associative processor(s) comprise one or more associative string processors.

31. A memory address engine adapted to receive initializing parameters set by an external controller, the initializing parameters defining an array of contiguous image data points in a selected planar surface within a multiplanar image, and the memory address engine comprising:
- an address generator comprising an array of associative processors arranged in a Single Instruction Multiple Data (SIMD) configuration, the address generator adapted to generate a plurality of non-contiguous memory addresses according to at least one algorithm implemented on received initializing parameters, and the at least one algorithm configured in hardware components;
- wherein the received initialization parameters mathematically define an initial data point in the selected planar surface of the multiplanar image, a column vector defining a unit increase in each column of the selected planar surface, a row vector defining a unit increase in each row of the selected planar surface, and column and row limits for the required data in the selected planar surface; and
- wherein the at least one algorithm operates to calculate the non-contiguous memory addresses progressively for each data point on a row in the selected planar surface and repeat for each row in the selected planar surface;
- collation means for collating non-contiguous memory addresses into a stream of output memory addresses for output to a data memory; and
- access means for determining whether a generated memory address is accessible to either the memory address engine or to a neighboring memory address engine;
- wherein the access means is adapted to calculate a memory address on behalf of a neighboring memory address engine.

32. The memory address engine of claim 31, wherein the address generator is arranged to process one or more initialization parameters specified in Cartesian coordinates.

* * * * *

UNITED STATES PATENT AND TRADEMARK OFFICE
CERTIFICATE OF CORRECTION

PATENT NO.        : 7,750,916 B2                                      Page 1 of 1
APPLICATION NO.   : 10/499875
DATED             : July 6, 2010
INVENTOR(S)       : Martin Whitaker It is certified that error appears in the above-identified patent and that said Letters Patent is hereby corrected as shown below:

Claim 21, column 19, line 41, after "data" insert --on the selected planar surface--

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,750,916 B2 | Page 1 of 1 |
| APPLICATION NO. | : 10/499875 | |
| DATED | : July 6, 2010 | |
| INVENTOR(S) | : Whitaker | |

It is certified that error appears in the above-identified patent and that said Letters Patent is hereby corrected as shown below:

In Fig. 7, Sheet 4 of 8, under "Description", Line 6, delete "tranfers." and insert -- transfers. --, therefor.

In Fig. 7, Sheet 4 of 8, under "Description", Line 9, delete "tranfers." and insert -- transfers. --, therefor.

In Fig. 7, Sheet 4 of 8, under "Description", Line 11, delete "tranfers." and insert -- transfers. --, therefor.

In Column 8, Line 15, delete "bytes" and insert -- bytes. --, therefor.

In Column 8, Line 38, delete "yScale" and insert -- yScale. --, therefor.

In Column 10, Line 35, delete "row is" and insert -- row --, therefor.

In Column 12, Line 10, after "transferred to" delete "is".

In Column 12, Line 40, delete "channel" and insert -- channel. --, therefor.

In Column 18, Line 20, Claim 5, delete "RowLimitL," and insert -- (RowLimitL, --, therefor.

In Column 18, Line 25, Claim 6, delete "(XInit," and insert -- (xInit, --, therefor.

Signed and Sealed this
Twenty-seventh Day of November, 2012

David J. Kappos
*Director of the United States Patent and Trademark Office*